3,560,220
DRIED EMULSIONS

James Gerow Bangert, 15 Pigeon Hill Road, Nanuet, N.Y. 10954, and Joseph John Halik, 1180 Midland Ave., Yonkers, N.Y. 10908
No Drawing. Filed Oct. 30, 1967, Ser. No. 679,178
Int. Cl. A23c 11/00
U.S. Cl. 99—63
11 Claims

ABSTRACT OF THE DISCLOSURE

An edible composition comprising fat, emulsifier, water-soluble caseinate, whey, and a buffer is provided. The composition may be prepared by drying an aqueous emulsion containing the ingredients, and there may also be included gums, thickeners, flavors, etc. The dried products are especially adapted for reconstitution with aqueous liquids such as water and/or milk and/or cream to furnish a baking ingredient, garnish, topping and dressing, especially of the sour cream type.

BRIEF SUMMARY OF THE INVENTION

This invention relates to an edible composition and a method of making the same. More particularly, it relates to a composition suitable for use in the preparation of baking ingredients, garnishes, toppings, dressings, and the like, and a method of making the same.

Compositions containing fat particles dispersed in, admixed with, or coated with edible water-soluble solids such as proteinaceous materials, carbohydrates, gums, thickeners and flavors are well known. In recent years, many of such compositions have found wide acceptance in various convenience food products such as cake mixes, topping mixes, sauce mixes, and the like. These compositions usually contain carbohydrates such as sucrose, lactose, corn syrup solids, milk solids dextrin, sweet whey, and like materials which are especially useful in the preparation of such compositions because the materials serve as fat-encapsulating agents. More importantly, the materials are used since sweet-tasting products are generally desired. To the present, however, compositions of this type in which a sweet taste is minimized and which are especially suitable, upon reconstitution, for the preparation of baking ingredients, garnishes, toppings, dressings, and the like, have not been widely available. Where they have been available, they have been noted to possess many disadvantages including poor performance, non-uniform taste characteristics and unsatisfactory keeping qualities.

Although sour cream mixes are available, most of such products are obtained by drying natural cultured cream, cultured market cream, cultured sour cream, and salad cream. Because of the drying step, certain of these products are characterized by difficulties in reconstitution and by certain off-flavors which develop during the processing. Because sour cream provides a flavorful base for various garnishes, toppings, dressings, as well as sauces and spreads for salads, vegetables, meats, pastries, baked goods, and the like, it has long been used in the culinary arts in the preparation of many dishes and traditional foods. The pleasant, mild acid flavor and smooth, firm body of fresh sour cream are desired by many consumers but even when refrigerated, sour cream has a shelf life of about 14 to 21 days after which the product rapidly deteriorates. Separation of the whey from the curd usually takes place and the delicate flavor is adversely affected.

It is an object of this invention to provide a composition having extended shelf life which may be reconstituted with aqueous liquids such as water and/or milk and/or cream to obtain a product closely resembling fresh sour cream and suitable for use as a baking ingredient, garnish, topping, dressing, or the like.

In accordance with the present invention, it has now been discovered that a composition comprising fat, an emulsifier, a water-soluble caseinate and whey may be readily prepared by employing a suitable buffer. It appears that the buffer unexpectedly aids the reconstitution of the ingredients when they are combined with water and/or milk and/or cream. Moreover, it has been surprisingly found that curdling of the fatty emulsion prior to its being dried as, for example, by spray-drying or other drying methods can be minimized or eleminated with the result that an improved product is obtained.

DETAILED DESCRIPTION

While fatty emulsions containing fat, emulsifier, proteinaceous and carbohydrate materials have been prepared, see, for example, U.S. Pat. No. 2,913,342, the proteinaceous and carbohydrate materials usually include ingredients that are characterized by their sweetness such as sweet whey solids, sucrose, dextrose, lactose, corn syrup solids, milk solids, dextrin, and the like. However, where fatty emulsion products having a mild acid taste, such as a sour cream type baking ingredient, garnish, topping, dressing, or the like, are desired, such ingredients cannot ordinarily be used because of their undesirable sweet taste or poor performance of the products upon reconstitution. Thus, for example, when a fatty emulsion is proposed to be formed containing fat, emulsifier, a water-soluble caseinate, such as sodium caseinate, and acid whey, it has been observed that the acid whey tends to curdle the casein thereby causing processing difficulties and poor encapsulation of the fat.

While we do not wish to be bound by any particular theory regarding our invention, it appears that the isoelectric points of the casein, lactalbumin, lactglobulin and other milk-derived products which may be present markedly influence emulsion stability. However, by the use of a suitable buffer, the pH of the fatty emulsion may be maintained at a level of approximately about 4.6 to 5.1 at which curdling of the emulsion and precipitation or settling out of the casein and milk-derived products are avoided. Moreover, the employment of a buffer permits even sweet whey to be employed in the fatty emulsion providing that the desired acidity and tart taste are achieved by having lactic acid present. Thus, a combination of sweet whey and acid whey may be ingredients of the fatty emulsion, it appearing that the amount of lactic acid in the whey utilized is a controlling factor. However, although lactic acid may be added to the whey ingredient so as to obtain a standardized product for processing purposes, acid whey is usually employed.

The buffer may be any one or a mixture of a large number of soluble, edible compounds which are effective over the pH range of about 4.6 to 5.1 during the preparation of the composition in emulsion form as well as its later reconstitution from the dried state. Illustrative of the buffers which may be used are alkali metal and ammonium salts of hydroxy carboxylic acids such as citric, lactic, tartaric, adipic and malic and phosphoric acids of varying complexity. Of these, the sodium salts are especially desirable and sodium citrate is particulary preferred.

The fat may be any one of those normally employed in food products adapted to be used as toppings and the like. For example, lard, modified lard, cottonseed, coconut, peanut and corn oils which may be fully or partially hydrogenated, may be employed. The fat or fats may be any combination of semi-solid or solid fats and may have the melting point range, saponification value, iodine number and other characteristics found to be desirable in the preparation of topping compositions. The fat will ordinarily comprise 25 to 50% of the composition and preferably, 35 to 40%.

The emulsifier may be any of a large class of edible emulsifiers including, but not restricted to, lactylated fatty acid glycerides, glycerol esters of fatty acids, phosphoric acid esters of glycerides, partial esters of glycols and higher saturated fatty acids, acetylated derivatives of mono- and di-glycerides of fatty acids, and partial esters of sorbitan and fatty acids and polyoxyalkylene derivatives thereof. A preferred type of emulsifiers are the partial esters of a glycol and the higher saturated fatty acids such as propylene glycol monostearate and propylene glycol monopalmitate.

The amount of emulsifier may be varied from about 10 to 25% basis the weight of the fat, with about 20% being preferred.

Lecithin and hydroxylated lecithin may be employed in conjunction with the emulsifiers of the class just mentioned.

The amount of water-soluble caseinate such as sodium caseinate may range from about 5 to 40% basis the weight of the fat; an amount of about 25% is usually desired. Other proteinaceous materials such as non-fat dry milk solids, buttermilk solids, neutral water-soluble soy protein derivatives, and the like may also be ingredients of the composition. The term "water-soluble" is also intended to include water-dispersible.

The amount of whey, as whey solids, present in the composition may range from about 25 to 100%, basis the weight of the fat.

The amount of buffer may be varied considerably depending upon the isoelectric points of the caseinate employed and other milk-product derivatives which may be present and the acidic characteristics of the whey. However, the buffer must be present in an amount so as to provide a pH of about 4.6 to 5.1 in the emulsion so as to eliminate curdling thereof prior to drying as by spray-drying, drum-drying, or the like.

Various gums such as the cellulose ethers, algins, gum arabic, gum tragacanth, locust bean gum, guar gum, gelatin, carrageenan, and the like, may be employed as adjuncts for the composition. Such gums may be desirably added to the emulsion prior to the drying thereof so as to aid in the encapsulation of the fat, but they may also be added to the product following the drying step so as to afford additional body, texture and thickening properties to the composition upon its reconstitution with water and/or milk and/or cream. In a similar manner, flour, raw or gelatinized starches from various sources such as corn, tapioca, potato, sago, sorghum, rice, waxy maize, wheat, and the like, may be employed as encapsulants and thickeners.

The composition may, and usually will, include additional components such as acids, salts of mineral acids, and flavor to provide the desirable mild acid flavor and taste to the reconstituted product. Suitable acids include citric, lactic, tartaric, adipic, fumaric and malic. Suitable acid salts include sodium chloride, aluminum potassium sulfate, and the like.

In order to illustrate the present invention but not in any way to limit it, the following example is given:

EXAMPLE

Emulsion formulation

| Ingredients: | Parts by weight |
|---|---|
| Fat (76° coconut oil) | 38.00 |
| Propylene glycol monostearate | 8.64 |
| Hydroxylated lecithin | .88 |
| Tristearin | 2.48 |
| Sodium caseinate | 12.40 |
| Acid whey solids | 35.32 |
| Carboxy methyl cellulose | .64 |
| Sodium citrate | 1.64 |
| | 100.00 |

In preparing the dried emulsion from these ingredients, the coconut oil, propylene glycol monostearate, hydroxylated lecithin, and tristearin are blended and melted at 140°–150° F. Sodium citrate is added to 100 parts of water at a temperature of 145°–150° F. Sodium caseinate, acid whey solids and carboxymethylcellulose are then slowly added to the citrate-water solution and the mixture is agitated until smooth. The hot fatty mixture is then combined with the aqueous slurry and homogenized at 500 lbs. per sq. in. (gauge) in a Manton-Gaulin homogenizer. It is desirable to maintain the temperature during mixing at between about 100°–150° F. since this appears to improve the ease of formation of a good emulsion. The creamy emulsion that is formed is cooled to below 100° F. and then fed directly to a spray drier operating at inlet and outlet temperatures of about 375° F. and about 225° F. respectively. The spray-dried product may be cooled to about 40° F. before admixing with additional ingredients.

Total composition formulation

| Ingredients: | Parts by weight |
|---|---|
| Spray-dried component | 48.00 |
| Citric acid | .80 |
| Aluminum potassium sulfate | .17 |
| Sodium carrageenan | .25 |
| Flavor | .02 |
| Color | .00025 |
| | 49.24025 |

The spray-dried product is then dry blended with the remaining ingredients, namely, cirtric acid, aluminum potassium sulfate, sodium carrageenan, flavor and color.

Twenty-five grams of the composition so obtained is added to one-third cup of cold milk. The mixture is beaten briskly with a fork or spoon or hand beater until smooth and creamy, usually one or two minutes. The reconstituted product which may then be refrigerated for 30 minutes before serving is characterized by its smooth texture, absence of curdling, and its tanginess. The mix is well adapted for use as the base for dips, on baked potatoes, on salads and fruits, as well as in main dishes.

Following the procedure of the foregoing example, a spray-dried product was attempted to be formulated with the buffer salt, sodium citrate, omitted as an ingredient. However, processing difficulties were encountered in obtaining a smooth, creamy emulsion and also in spray-drying. Moreover, when a sample of the dried formulation was blended with milk, a lumpy poorly textured product, not having the characteristic smoothness of fresh sour cream, was noted to result.

While the present invention has been described by reference to certain preferred embodiments and specific examples, it will be apparent that alterations, modifications and substitutions will be obvious to those skilled in this art. Accordingly, such obvious alterations, modifications and substitutions are deemed to be included within the scope of the present invention which is to be limited only by the appended claims.

What is claimed is:

1. An edible composition adapted to be reconstituted with an aqueous liquid and suitable for use as a baking ingredient, garnish, topping or dressing comprising a dried emulsion of a fat, an emulsifier, a water-soluble caseinate, acid whey, and a buffer, said buffer being present in an amount sufficient so as to provide a pH of about 4.6 to 5.1 in said emulsion and to minimize curdling of said emulsion during preparation and reconstitution thereof.

2. A composition as in claim 1 in which said acid whey is acid whey solids.

3. A composition as in claim 2 in which said emulsifier is selected from the group consisting of fatty acid glycerides, lactylated glycerol esters of fatty acids, phosphoric acid esters of fatty acid glycerides, partial esters of a glycol and a higher saturated fatty acid, acetylated derivatives of mono- and di-glycerides of fatty acids, partial esters of sorbitan and fatty acids, polyoxyalkylene derivatives of partial esters of sorbitan and fatty acids, and mixtures thereof.

4. A composition as in claim 3 in which said partial ester of a glycol and a higher saturated fatty acid is propylene glycol monostearate.

5. A composition as in claim 3 in which said buffer is an alkali metal salt of a hydroxy carboxylic acid.

6. A composition as in claim 5 in which said salt is trisodium citrate.

7. A composition as in claim 2 in which said dried emulsion further comprises a gum.

8. An edible composition adapted to be reconstituted with an aqueous liquid and suitable for use as a baking ingredient, garnish, topping or dressing comprising a spray-dried emulsion of a water-soluble caseinate, a fat, an emulsifier, acid whey, a gum, and a buffer, said buffer being present in an amount sufficient so as to provide a pH of about 4.6 to 5.1 in said emulsion and to minimize curdling of said emulsion during preparation and reconstitution thereof.

9. A composition as in claim 8 in which said acid whey is acid whey solids.

10. A composition as in claim 9 in which said emulsifier is a partial ester of a glycol and a higher saturated fatty acid.

11. A composition as in claim 10 further admixed with an acid, a salt of a mineral acid, and flavor.

References Cited

UNITED STATES PATENTS

| | | | |
|---|---|---|---|
| 2,035,899 | 3/1936 | Kraft | 99—123 |
| 2,913,342 | 11/1959 | Cameron et al. | 99—123 |
| 3,098,748 | 7/1963 | Noznick et al. | 99—123X |
| 3,295,986 | 1/1967 | Saslaw et al. | 99—123 |
| 3,090,688 | 5/1963 | Noznick et al. | 99—56 |
| 3,357,838 | 12/1967 | Noznick | 99—56 |
| 3,433,643 | 3/1969 | Talter et al. | 99—56X |
| 3,443,960 | 5/1969 | Noznick et al. | 99—56X |

OTHER REFERENCES

Atlas Emulsifiers for Coffee Whiteners, publ. by Atlas Chemical Industries, Inc., Wilmington, Del., May 1965, pp. 1–12.

JOSEPH M. GOLIAN, Primary Examiner

U.S. Cl. X.R.

99—56, 118, 144